United States Patent [19]
Cloutier et al.

[11] Patent Number: 4,991,786
[45] Date of Patent: Feb. 12, 1991

[54] FILM CASSETTE

[75] Inventors: Robert P. Cloutier, Spencerport; David C. Smart; Roger G. Covington, both of Rochester, all of N.Y.

[73] Assignee: Eastman Kodak Company, Rochester, N.Y.

[21] Appl. No.: 464,267

[22] Filed: Jan. 12, 1990

[51] Int. Cl.$^5$ .............................................. G03B 17/26
[52] U.S. Cl. ................................ 242/71.100; 354/275
[58] Field of Search ..................... 242/71.1, 71.2, 71.7; 354/275, 212

[56] References Cited

U.S. PATENT DOCUMENTS

| | | | |
|---|---|---|---|
| 3,622,101 | 11/1971 | Sutliff et al. | 242/194 |
| 3,831,881 | 8/1974 | Tucker | 242/71.1 X |
| 3,894,700 | 7/1975 | Ito et al. | 354/275 X |
| 4,274,728 | 6/1981 | Waaske | 354/275 |
| 4,338,015 | 7/1982 | Holmes | 354/275 |
| 4,395,107 | 7/1983 | Lührig et al. | 354/275 |
| 4,482,232 | 11/1984 | Engelsmann et al. | 354/275 |
| 4,883,236 | 11/1989 | Niedospial et al. | 242/71.1 |

Primary Examiner—John M. Jillions
Attorney, Agent, or Firm—Roger A. Fields

[57] ABSTRACT

In a film cassette, a film spool is rotatable inside a cassette shell in an unwinding direction to thrust a leader section of a filmstrip coiled about the spool from within a light-tight film passageway to the exterior of the shell and in a winding direction to return the leader to the interior of the shell. A unidirectional arresting device is movable into engagement with the spool to prevent rotation of the spool in only the winding direction. The filmstrip includes an inclined edge for moving the arresting device out of engagement with the spool responsive to thrusting the leader substantially to the exterior of the shell, to allow the spool to be rotated in the winding direction in order to return the leader to the interior of the shell, and for permitting the arresting device to move into engagement with the spool responsive to return of the leader to within the passageway, to prevent the spool from being rotated further in the winding direction to thereby retain the leader in the passageway.

6 Claims, 6 Drawing Sheets

FILM CASSETTE

CROSS-REFERENCE TO RELATED APPLICATIONS

Reference is made to commonly assigned copending applications Ser. No. 07/296,475, now U.S. Pat. No. 4,880,179, entitled FILM CASSETTE, and filed January 12, 1989 in the name of David E. Beach, Ser. No. 07/464,254 entitled FILM CASSETTE, and filed Jan. 12, 1990 in the name of Thomas D. Jensen, and Ser. No. 07/464,256, entitled FILM CASSETTE and filed Jan. 12, 1990 in the name of Thomas D. Jensen.

BACKGROUND OF THE INVENTION

1. Field of the Invention

The invention relates generally to the field of photography, and particularly to a film cassette containing roll film. More particularly, the invention relates to a film cassette capable of propelling a non-protruding film leader to the exterior of the cassette shell.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, can be operated to automatically advance the filmstrip out of the cassette shell by rotating the film spool in the unwinding direction. The film leader normally does not protrude from the cassette shell. Specifically, in U.S. Pat. No. 4,407,579, granted October 4, 1983, there is disclosed a film cassette wherein the film spool is comprised of two spool pieces constructed to telescopically receive one another. Each spool piece includes a radially extending flange which is adapted to lie closely adjacent to but not in contact with one of the opposite sides of the film roll. A trailing end of the film roll is attached to one of the spool pieces, and a leading end of the roll rests against a cylindrical insert located between the two flanges and the cassette shell. The insert restricts the maximum diameter of the film roll to a value less than the diameter of the flanges, and it includes an integral stripper-guide located immediately ahead of a slot in the insert which leads to the light-trapped film passage opening of the cassette shell. To move the leading end of the film roll over the stripper-guide, into the slot, and through the light-trapped opening, to make it available outside the film cassette, one must manually grasp the opposite ends of the film spool and move the two spool pieces axially toward one another until the flanges are axially positioned in firm clamping relation with the opposite sides of the film roll. While maintaining this inwardly directed manual pressure against the two spool pieces, one then must rotate the film spool relative to the cassette shell in an unwinding direction. As a result, the leading end of the film roll will be rotated relative to the insert, causing it to be advanced over the stripper-guides into the slot, and through the light-trapped opening to the exterior of the cassette shell. The film cassette disclosed in U.S. Pat. No. 4,407,579 suffers several shortcomings. For one, it must be operated manually to advance the leading end of the film roll to the exterior of the cassette shell. This must be done before the film cassette is loaded into a camera. Another shortcoming is that the leading end of the film roll may be shifted axially when the two spool pieces are axially moved toward one another, in which instance the leading end may stub against the cylindrical insert and not be able to enter the slot to exit the cassette shell when the film spool is rotated in the unwinding direction.

Commonly assigned U.S. Pat. No. 4,846,418, granted July 11, 1989 discloses a film cassette wherein the leading end of a film roll coiled about a film spool is located within the cassette shell. The film spool is comprised of two spool pieces constructed to telescopically receive one another. Each spool piece includes a radially extending flange normally disposed adjacent one of the opposite sides of the film roll. When the film spool is initially rotated in a film unwinding direction, a rotation-responsive cam device coupling the two spool pieces automatically moves one spool piece axially toward the other piece to cause the respective flanges to firmly clamp the film roll at its opposite sides. Then, with continued rotation of the film spool in the same direction, the leading end of the film roll will be advanced over a stripper-guide which strips the leading end from between the flanges and guides it through a light-trapped opening in the cassette shell to the outside of the shell. Thus, as compared to U.S. Pat. No. 4,407,579, in U.S. Pat. No. 4,846,418 there is no need to operate the film cassette manually. Instead, the film cassette can be operated automatically in a camera.

The Problem

In the respective film cassettes disclosed in U.S. Pat. Nos. 4,407,579 and 4,846,418, the leading end of the film roll is normally located inwardly of the light-trapped opening in the cassette shell to the outside of the shell. When the film spool is rotated in the film unwinding direction, the leading end is required to "seek" an entrance to the light-trapped opening in order to move into and through the opening to the outside of the cassette shell. If the leading end for any reason cannot find the entrance to the light-trapped opening, it will be prevented from exiting the cassette shell.

SUMMARY OF THE INVENTION

The invention advantageously solves the problems described above by providing a film cassette comprising a film spool rotatable inside a cassette shell in an unwinding direction to thrust a leader section of a filmstrip coiled about the spool from within a light-tight film passageway to the exterior of the shell and in a winding direction to return the leader to the interior of the shell, which is characterized in that:

unidirectional arresting means is movable into engagement with the spool for preventing rotation of the spool in only the winding direction; and the filmstrip includes actuating means for moving the arresting means out of engagement with the spool responsive to thrusting the leader substantially to the exterior of the shell, to allow the spool to be rotated in the winding direction in order to return the leader to the interior of the shell, and for permitting the arresting means to move into engagement with the spool responsive to return of the leader to within the passageway, to prevent the spool from being rotated further in the winding direction to thereby retain the leader in the passageway.

Thus, since the leader cannot be returned to the interior of the cassette shell beyond the film passageway, it is not necessary that the leader "seek" an entrance to the passageway to exit the shell.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
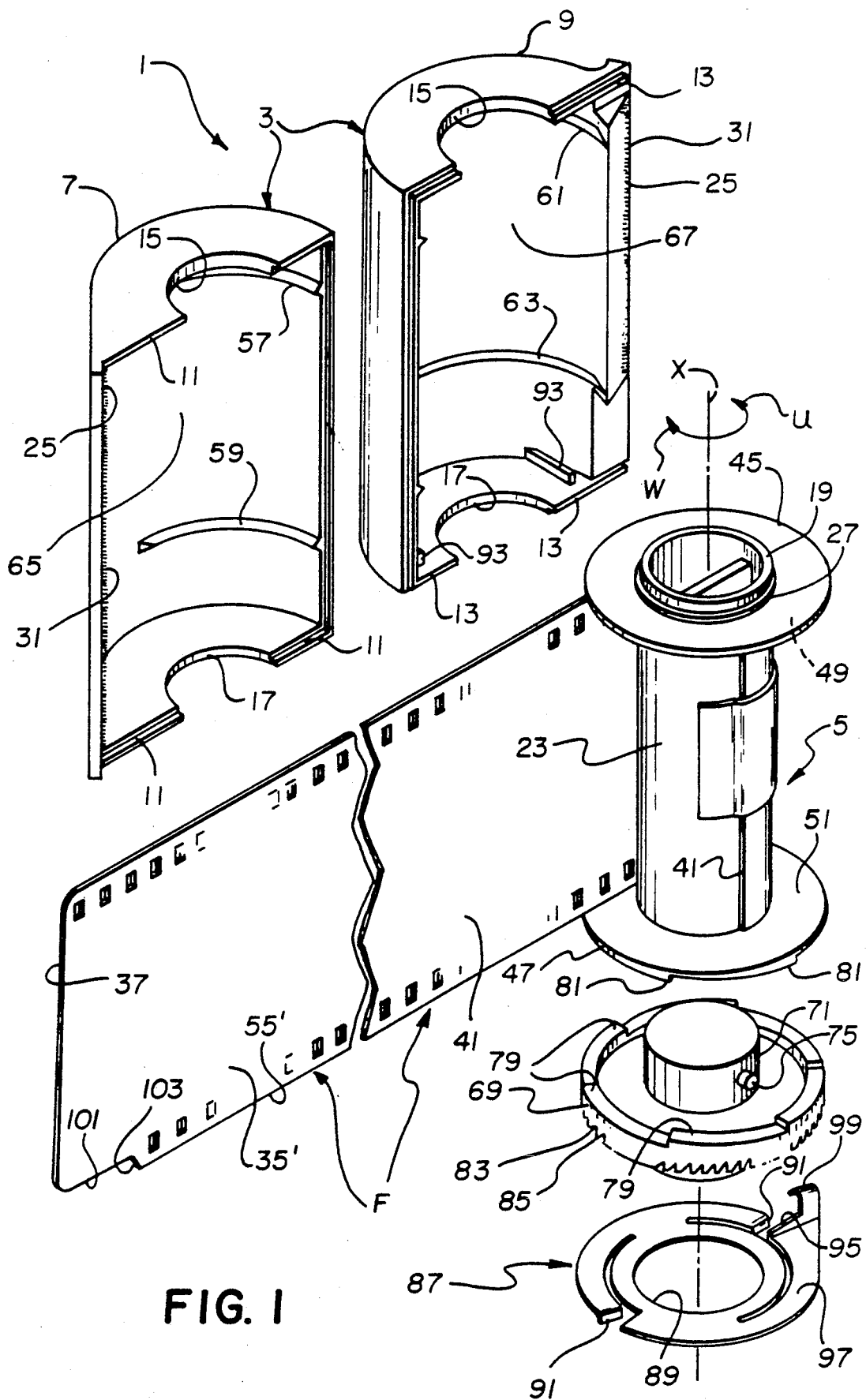
FIG. 1 is an exploded perspective view of a film cassette according to a preferred embodiment of the invention.
Figure 2:
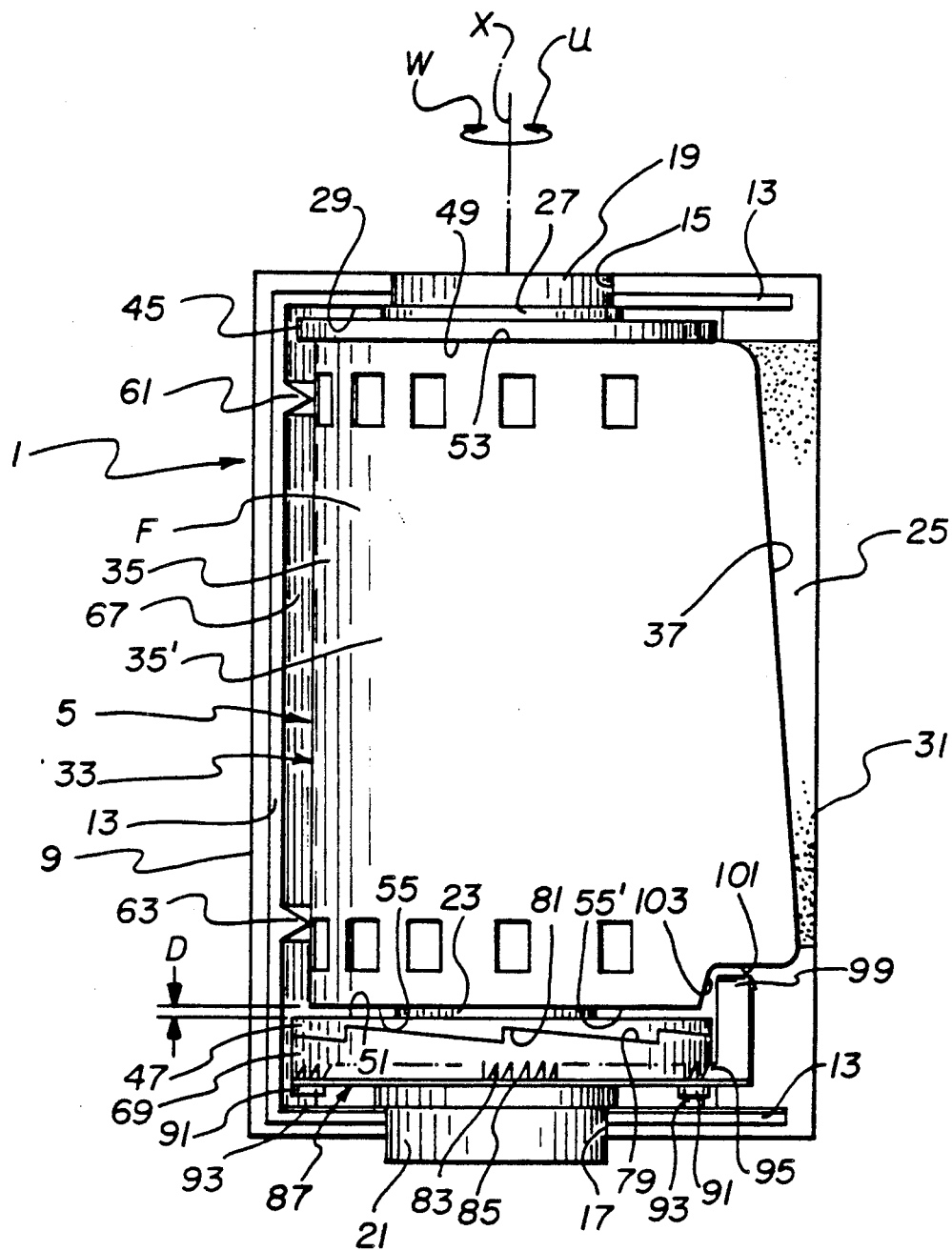
FIG. 2 is an elevation view of the film cassette, illustrating one-half of the cassette shell containing a film roll coiled about a film spool.

Referring now to the drawings, FIGS. 1 and 2 depict an improved 35 mm film cassette 1 comprising a light-tight cassette shell 3 and a film spool 5 which is rotatable about an axis X in film unwinding and film winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for upper and lower opposite end extensions 19 and 21 of a spool core or hub assembly 23, and they define a film passageway 25 to the exterior of the cassette shell 3. The upper end extension 19 of the spool core 23 includes an integral annular surround 27 located against an upper inside face 29 of the cassette shell 3 which encircles the opening 15. This is to prevent ambient light from entering the interior of the cassette shell 3 through the opening 15. A known black velvet or plush material 31 lines the interior of the film passageway 25 to prevent ambient light from entering the film passageway.

Figure 3:
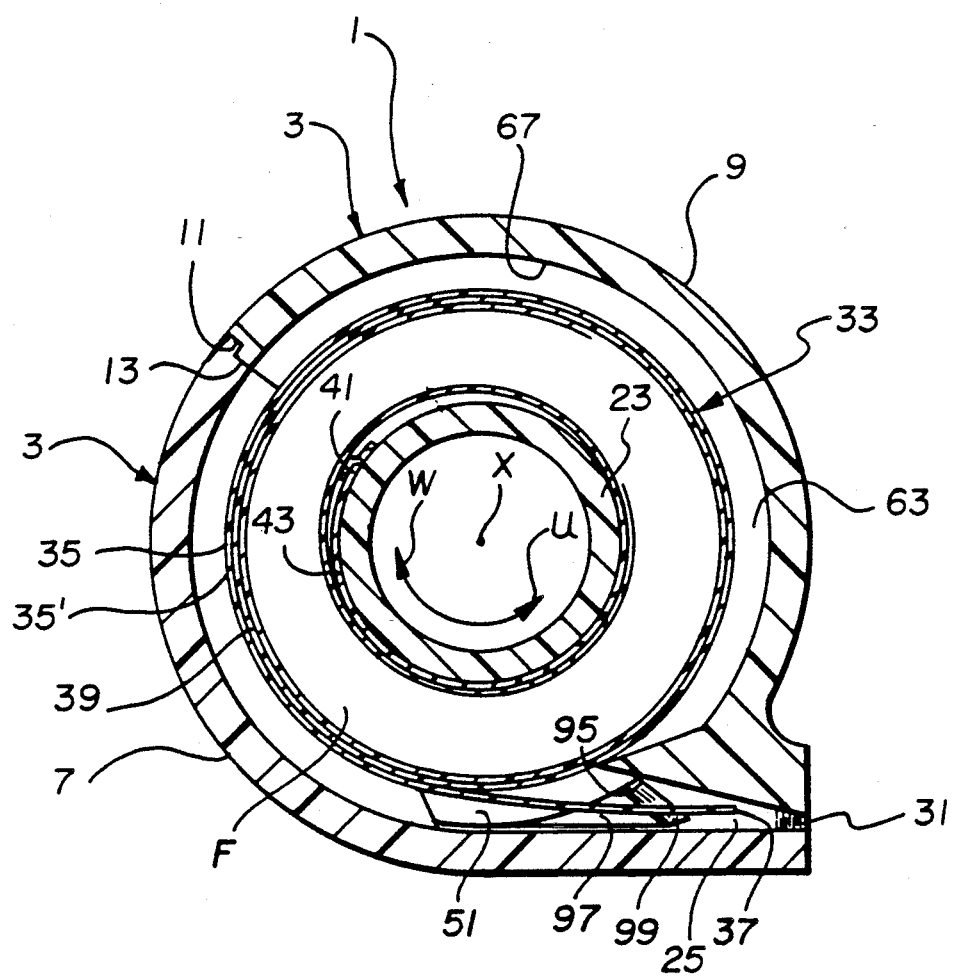
FIG. 3 is an end view in cross-section of the cassette shell, the film roll, and the film spool.

A roll 33 of 35 mm filmstrip F is coiled about the spool core 23 to form successive film convolutions. As shown in FIG. 3, the film roll 33 includes an outermost convolution 35 which is a film leader 35' having a leading or forward end 37, and it includes a next-inward convolution 39 coiled behind the outermost convolution. An inner or trailing end 41 of an innermost convolution 43 of the film roll 33 is secured to the spool core 23 by conventional means (not shown).

A pair of upper and lower flanges 45 and 47 radially extending fixedly from the spool core 23 are coaxially spaced to locate their respective flat inside faces 49 and 51 relative to opposite sides 53 and 55 of the film roll 33 as shown in FIG. 2. The upper flange 45 is rigid and its inside face 49 firmly contacts the side 53 of the film roll 33. The lower flange 47 is resiliently flexible and its inside face 51 is slightly spaced a distance D from the side 55 of the film roll 33.

The maximum diameter of the film roll 33 is restricted to a value less than the diameter of the upper and lower flanges 49 and 51 by two pairs of arcuate ribs 57, 59 and 61, 63, fixed to the two halves 7 and 9 of the cassette shell 3 at their respective inner walls 65 and 67. The four ribs 57, 59, 61, and 63 protrude radially between the two flanges 49 and 51 to circumstantially confine the outermost convolution 35 of the film roll 33 to thereby prevent the outermost convolution from radially expanding or clock-springing beyond the peripheries of the flanges to the shell walls 65 and 67. See FIGS. 1-3. Preferably, the ribs 57, 59, 61, and 63 are relatively smooth at their respective areas of contact with the outermost convolution 35.

Figure 4:
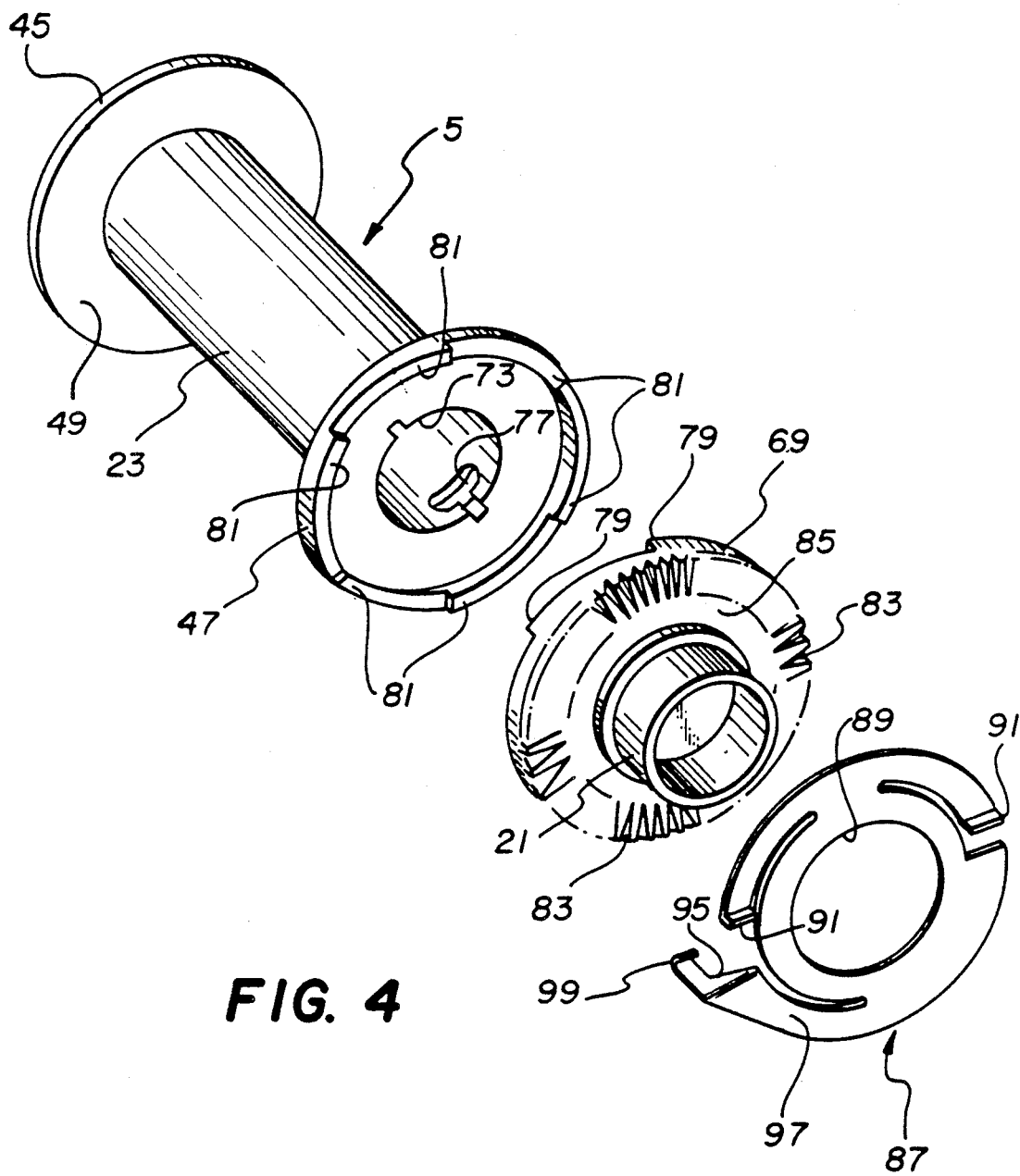
FIGS. 4 and 5 are exploded perspective views of the film spool and an associated camming flange and spool lock.
Figure 5:
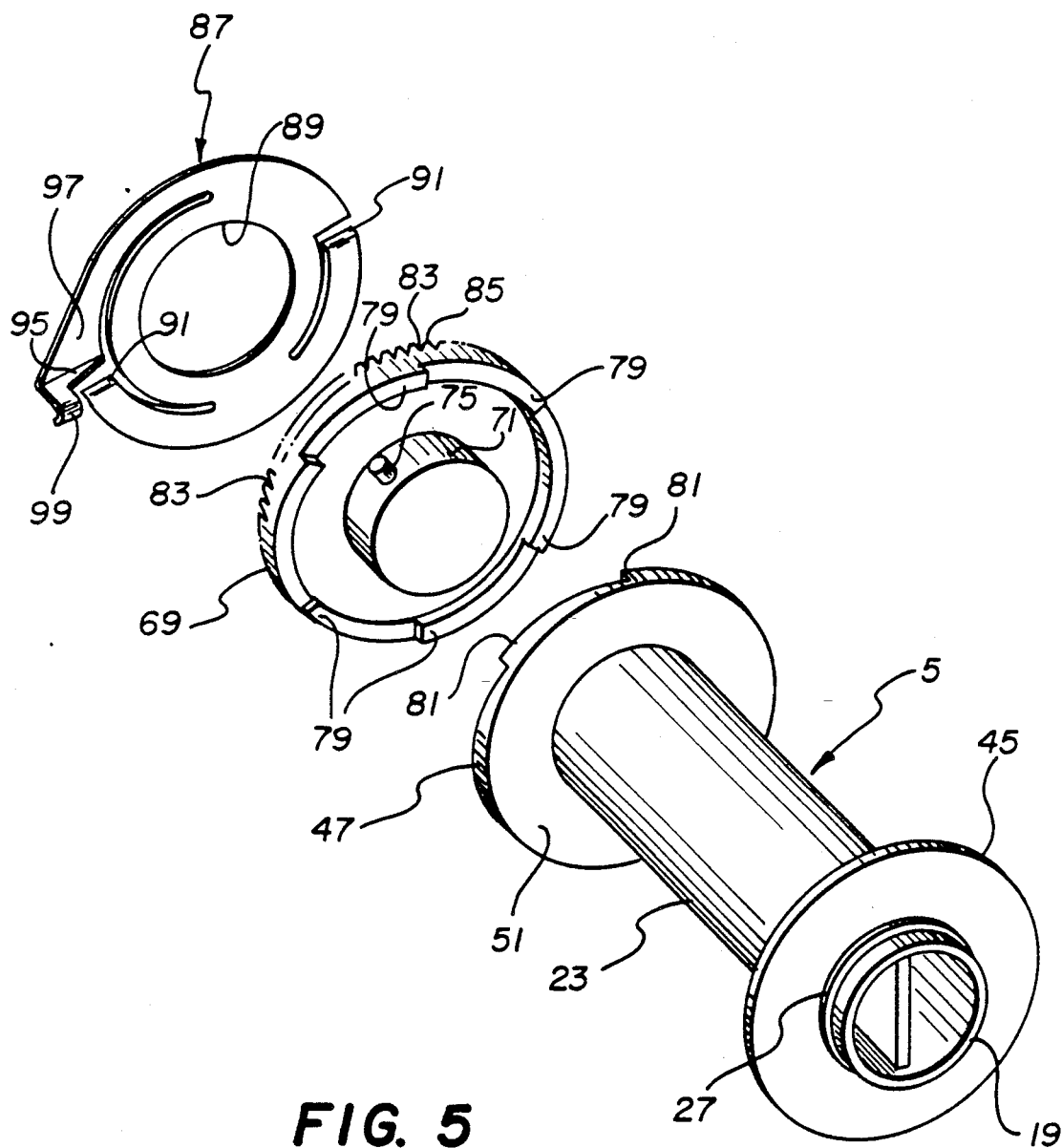

As shown in FIGS. 1, 4, and 5, the film spool 5 includes a camming flange 69 integrally coaxially formed with the lower end extension 21 of the spool core 23 and with a coupling element 71 which is received in a central well 73, through the spool flange 47, partly into the spool core. The coupling element 71 has a pair of coupling posts (only one shown) 75 which extend into respective slots 77 (only one shown), within the well 73, in the spool core 23 to limit rotation of the camming flange 69 relative to the spool flange 47 in the unwinding and winding directions U and W to approximately 55°. When the camming flange 69 is rotated relative to the spool flange 47 in the unwinding direction U approximately 55°, from its orientation shown in FIG. 2 to the orientation shown in FIG. 6, six identical camming surfaces 79 of the camming flange will impart motion to corresponding identical cam follower surfaces 81 of the spool flange 47 to flex (deflect) the latter flange the distance D at its periphery into a very firm frictional (compressive) relation with the outermost convolution 35 of the film roll 33 to axially clamp the outermost convolution between the two spool flanges 45 and 47. In essence, the inside face 51 of the spool flange 47 will be transformed from a flat shape to a generally concave shape. This concentrates the clamping forces provided by the two spool flanges 45 and 47 substantially at the outermost convolution 35. At the same time, since the spool flange 45 is rigid and is normally in contact with the side 53 of the film roll 33, the film roll 33 including the outermost convolution 35 cannot be shifted axially. Then, continued rotation of the camming flange 69 in the unwinding direction U, in its orientation shown in FIG. 6, will rotate the spool core 23 including the two spool flanges 45 and 47 in the same direction to similarly rotate the film roll 33 to thrust the film leader 35' to the exterior of the cassette shell 3.

Figure 6:
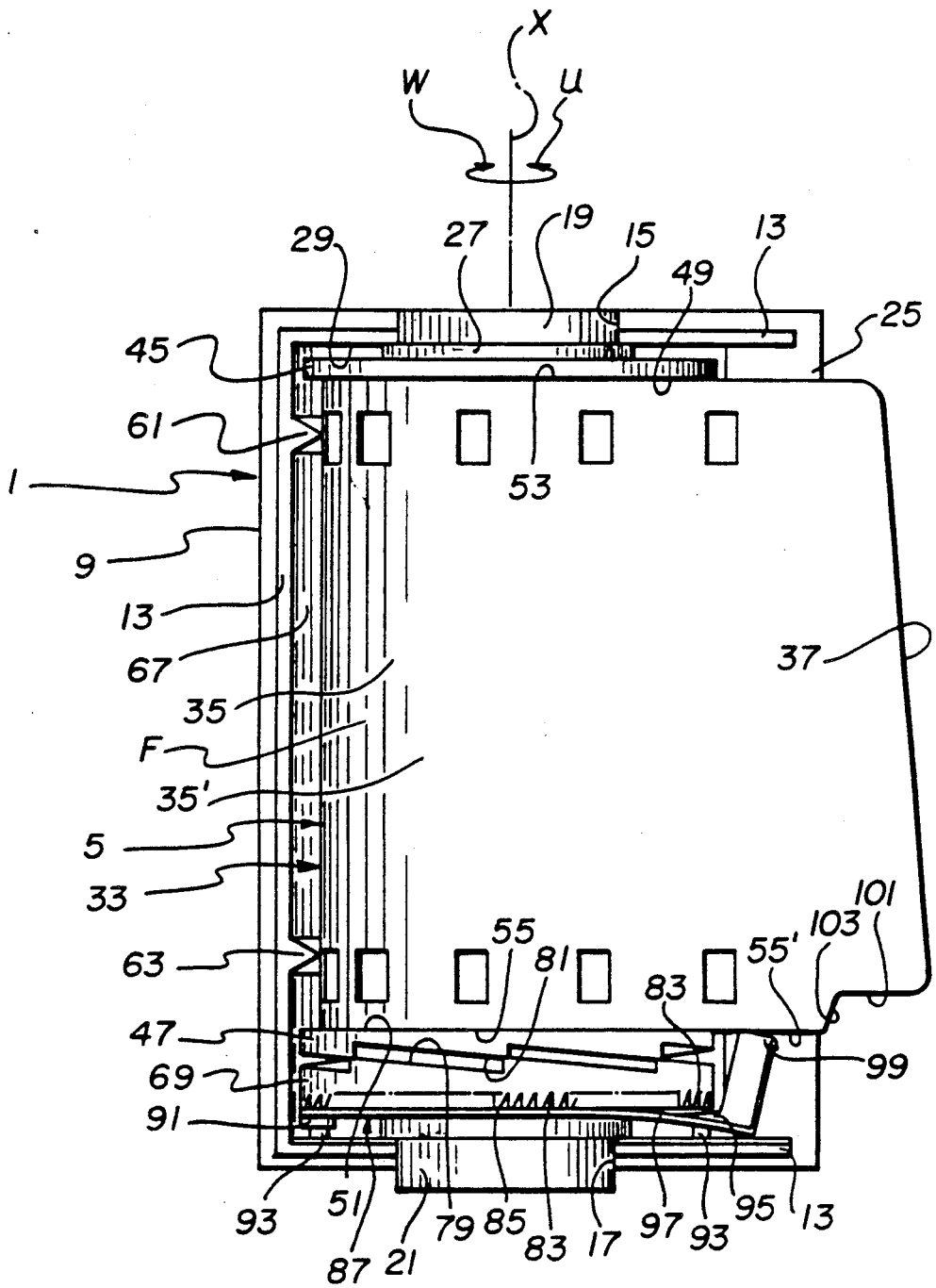
FIG. 6 is an elevation view similar to FIG. 2, illustrating operation of the camming flange and spool lock.

When the camming flange 69 is rotated approximately 55° relative to the spool flange 47 in the winding direction W, from its orientation shown in FIG. 6 to the orientation shown in FIG. 2, the camming surfaces 79 of the camming flange will interact with the cam follower surfaces 81 of the spool flange to allow the spool flange to return, by virtue of its own resilience, to the original non-deflected condition shown in FIG. 2. Since the periphery of the spool flange 47 will have moved the distance D, the periphery will have separated from the outermost convolution 35 of the film roll 33. This facilitates rewinding of the filmstrip F onto the spool core 23 as the spool core is rotated in the winding direction W.

According to the invention, the camming flange 69 includes a continuous coaxial annular array of interdental notches (or other engageable means) 83 cut-in an outside face 85 of the flange. See FIGS. 4 and 5. An arresting device 87 has a central opening 89 in which the end extension 21 of the spool core 23 is disposed to allow the arresting device to normally be seated against the outside face 85 of the camming flange 69. A pair of integral tabs 91 of the arresting device 87 are fixed to corresponding integral stops 93 of the cassette half 9 to prevent the arresting device from being rotated in the unwinding direction U or the winding direction W. See FIG. 1. The arresting device 87 includes a pawl 95 adapted to fall into anyone of the notches 83 to prevent rotation of the spool core 23 in only the winding direction W. See FIG. 2. A resiliently flexible member 97 of the arresting device 87 biases the pawl 95 normally into anyone of the notches 83, and it urges a follower member 99 of the arresting member normally into a cut-away 101 of the film leader 35' along its longitudinal film edge 55' at a location proximate the forward end 37 of the leader. Conversely, when the pawl 95 is separated from the notches 83, the flexible member 97 urges the follower member 99 against the longitudinal film edge 55' at a location rearward of the cut-away 101. See FIG. 6.

Operation

When the spool core 23 is rotated in the unwinding direction U to similarly rotate the film roll 33 to thrust the film leader 35' to the exterior of the cassette shell 3, the follower member 99 rides out of the cut-out 101 along a slope 103 of the longitudinal film edge 55' to lift the pawl 95 out of one of the notches 83, contrary to the urging of the flexible member 97. See FIGS. 2 and 6. If, subsequently, the spool core 23 is rotated in the winding direction W to similarly rotate the film roll 33 to return the film leader 35' to the interior of the cassette shell 3, the follower member 99 will return down the slope 103 into the cut-out 101, allowing the pawl 95 to fall into one of the notches 83 to prevent further rotation of the spool core and the film roll in the winding direction. This occurs when the film leader 35' is located with its forward end 37 in the film passageway 25. See FIG. 2. Thus, the film leader 35' will be stopped from being wound completely inward of the film passageway 25, but will be allowed to be advanced out of the cassette shell 3.

The invention has been described with reference to a preferred embodiment. However, it will be appreciated that variations and modifications can be effected within the ordinary skill in the art without departing from the scope of the invention. For example, the notches 83 need not be cut in the camming flange 69. Instead, they can be cut in some other part of the spool core 23, such as the end extension 23 of the spool core or the spool flange 45.

We claim:

1. A film cassette comprising a film spool rotatable inside a cassette shell in an unwinding direction to thrust a leader section of a filmstrip coiled about said spool from within a light-tight passageway to the exterior of said shell and in a winding direction to return said leader to the interior of the shell, is characterized in that:

unidirectional arresting means is movable into engagement with said spool for preventing rotation of the spool in only the winding direction; and said filmstrip includes actuating means for moving said arresting means out of engagement with said spool responsive to thrusting said leader substantially to the exterior of said shell, to allow the spool to be rotated in the winding direction in order to return the leader to the interior of the shell, and for permitting the arresting means to move into engagement with the spool responsive to return of the leader to within said passageway, to prevent the spool from being rotated further in the winding direction to thereby retain the leader in the passageway.

2. A film cassette as recited in claim 1, wherein said spool includes a continuous plurality of engageable means adapted for respective engagement with said arresting means to prevent rotation of said spool in only the winding direction.

3. A film cassette as recited in claim 2, wherein said arresting means is biased to individually engage said plurality of engageable means of the spool, and said actuating means of the filmstrip includes a longitudinal film edge for supporting said arresting means out of engagement with anyone of said engageable means.

4. A film cassette as recited in claim 3, wherein said actuating means of the filmstrip includes a cut-away of the longitudinal film edge along said leader for receiving said arresting means to permit the arresting means to move into individual engagement with said plurality of engageable means.

5. A film cassette as recited in claim 4, wherein said plurality of engageable means includes a continuous coaxial array of interdental notches formed in said spool, and said arresting means includes a pawl adapted to fall into anyone of said notches to prevent rotation of said spool in only the winding direction.

6. A film cassette as recited in claim 5, wherein said arresting means includes a follower member adapted to contact said longitudinal film edge or to be received in said cut-away of the longitudinal film edge and a resiliently flexible member fixed to said shell to urge said pawl into anyone of said interdental spaces and to urge said follower member into contact with the longitudinal film edge or into the cut-away.

* * * * *

UNITED STATES PATENT AND TRADEMARK OFFICE
CERTIFICATE OF CORRECTION

PATENT NO. : 4,991,786
DATED : February 12, 1991
INVENTOR(S) : Robert P. Cloutier et al.

It is certified that error appears in the above-identified patent and that said Letters Patent is hereby corrected as shown below:

| | |
|---|---|
| Column 4, line 27 | the word "circumstantially" should read --circumferentially-- |
| Title Page, item [75] | The title should read - -FILM CASSETTE WITH SPOOL LOCK- - |
| Column 1, line 1 | The title should read - -FILM CASSETTE WITH SPOOL LOCK- - |

Signed and Sealed this

Twentieth Day of October, 1992

*Attest:*

DOUGLAS B. COMER

*Attesting Officer*  *Acting Commissioner of Patents and Trademarks*